F. V. BURMAN.
DRYING APPARATUS.
APPLICATION FILED JUNE 25, 1919.
1,336,422.
Patented Apr. 13, 1920.
2 SHEETS—SHEET 2.
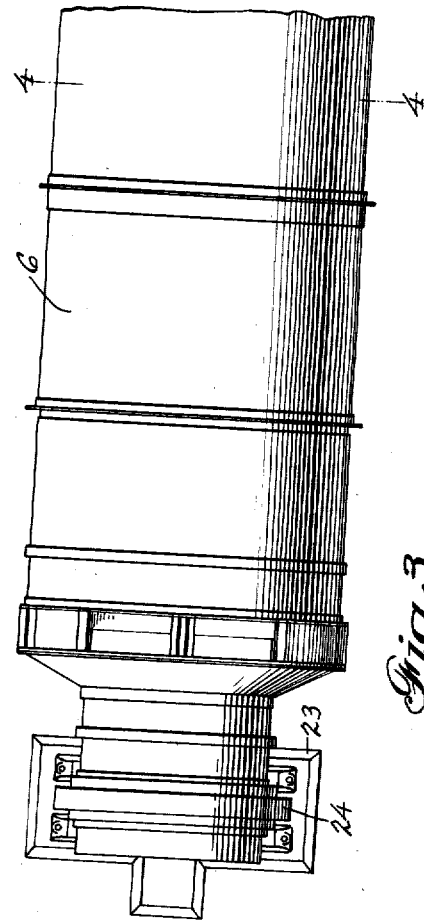
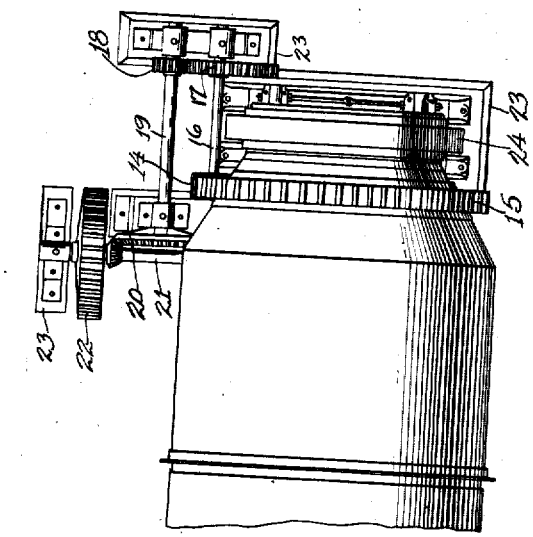
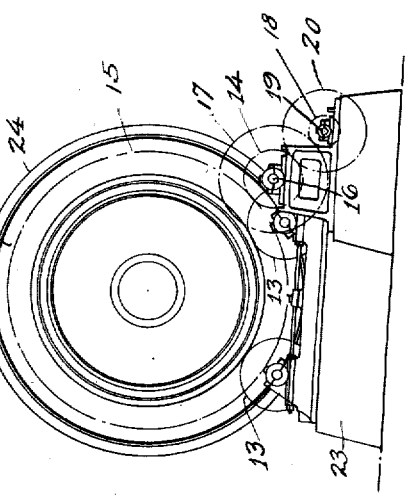
INVENTOR.
F. V. Burman
BY
ATTORNEYS.

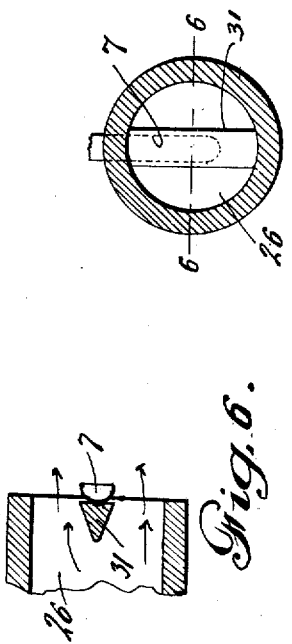
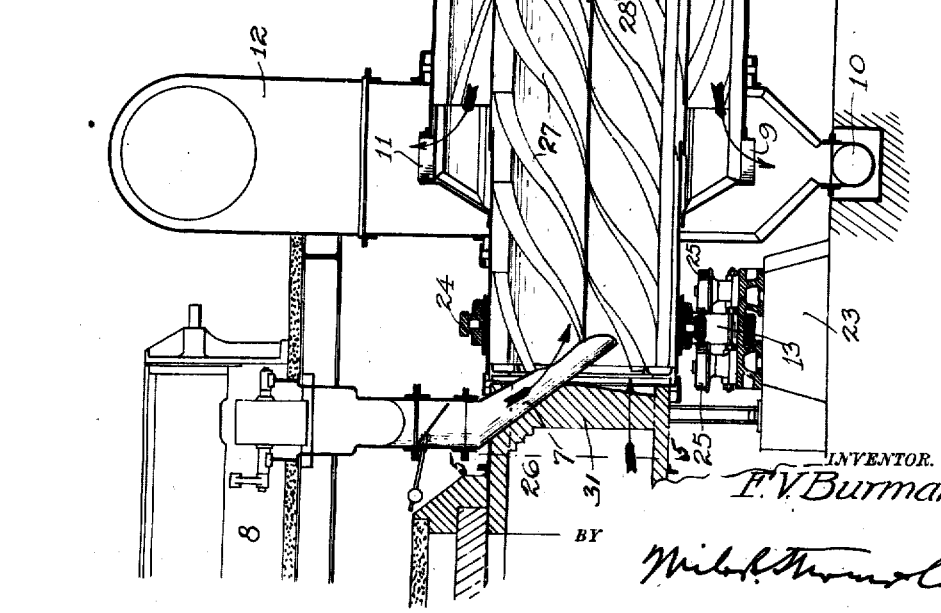

UNITED STATES PATENT OFFICE.

FRANK V. BURMAN, OF MARINE CITY, MICHIGAN.

DRYING APPARATUS.

1,336,422.     Specification of Letters Patent.     Patented Apr. 13, 1920.

Application filed June 25, 1919. Serial No. 306,580.

*To all whom it may concern:*

Be it known that I, FRANK V. BURMAN, a citizen of the United States, residing at Marine City, in the county of St. Clair and State of Michigan, have invented new and useful Improvements in Drying Apparatus, of which the following is a specification.

This invention relates to drying apparatus in which the material is dried by being passed through a revolving cylinder or drum.

The invention has for its object to provide a novel and improved mounting of the drum, and also to provide the interior thereof with a means whereby the drying action is expedited.

The object stated is attained by means of a combination and arrangement of parts to be hereinafter described and claimed, and in order that the same may be better understood, reference is had to the accompanying drawings forming a part of this specification.

In the drawings,

Figure 1 is a longitudinal section of the apparatus;

Fig. 2 is a plan view thereof;

Fig. 3 is an end view,

Fig. 4 is a cross section on the line 4—4 of Fig. 2,

Fig. 5 is a cross section on the line 5—5 of Fig. 1, and

Fig. 6 is a horizontal section on the line 6—6 of Fig. 5.

Referring specifically to the drawings, 5 and 6 denote, respectively, two concentrically arranged and horizontally positioned cylinders or drums adapted to receive the material to be dried. The drum 5 is inside the drum 6 and is open at one end to receive the material from a discharge chute 7 extending into said end and leading from a suitable conveying apparatus 8, which latter need not be described as it forms no part of the present invention. The other end of the drum 5 is also open to discharge into the corresponding end of the outer drum 6 as shown by the arrow in Fig. 1, and it passes through this drum to a bottom outlet 9 at the opposite end thereof, and drops on a conveyer 10. Diametrically opposite the outlet 9 for the dried material, the drum 6 has an outlet 11 for the vapors rising from the material in its passage through the drum. This vapor outlet opens into a flue 12 which is connected to the inlet of a suction fan for withdrawing the vapors.

The two drums are fastened together in any approved manner, and the outer drum 6 is shorter than the inner drum 5 so as to leave the ends of the latter projecting from the former. These projecting ends of the drum 5 are supported on rollers 13 as usual so as to be free to rotate. The drums receive motion from a drive pinion 14 meshing with a circular rack 15 on the rear end of the outer drum 6. The pinion 14 is on a shaft 16 having a spur gear 17 which is in mesh with a pinion 18 on a shaft 19, obtaining motion through a bevel gearing 20 from a shaft 21 provided with a pulley 22 driven from a suitable power source. The bearings for the several roller and gear shafts are supported on base stands 23. The rollers 13 are not in direct contact with the drum 5, but the latter is provided with external tracks 24 for the rollers.

At the front end of the drum 6 are also two laterally spaced rollers 25 mounted on vertical axes and positioned on opposite sides of the track 24. This end of the drum is next to a furnace 26 which supplies heated air to the drums, the same being forced through the drums by a fan as usual. The purpose of the rollers 25 is to hold the drums in fixed position so that the expansion of the metal from the heat causing the drums to expand, will not cause any change in the position of the forward or fire end of the drums. The expansion takes place toward the rear end of the drums where there are no connections to stationary parts of the apparatus. The track 24 provides an abutment on the drum 5, and as the abutment seats between the rollers 25, the drum is held as described.

In the drum 5 are flights 27 in screw form for urging the material to the rear end thereof for discharge into the drum 6, and in the drum 6 are similar flights 27ª, but reversely arranged to carry the material back to the outlet 9.

In the inner drum 5 are also rigidly mounted partition plates 28 to turn with the drum. These plates are radially positioned and they are set alternately at right angles to each other. Each plate is formed with a plurality of apertures 29 and projecting teeth 30, formed by punching the plate and bending the punched parts outward to project from the plate. The plates are punched to produce triangular apertures and correspondingly shaped teeth.

In operation, the material passing through the drum 5 drops on the plates 28 which are kept hot by the heated air passing through the drum. The hot air draws the material through the apertures 29 while the drum is revolving, and as the plates are hot, the material in contact therewith is quickly dried. The projecting teeth 30 stir or separate the material so that the hot air can come in contact with all the particles. A greater heating surface is therefore obtained, and at the same time the material is prevented from gathering in a mass. The hot air comes in contact with all portions of the material and the drying action is therefore expedited.

The apparatus has been designed more particularly for drying beet pulp, but it is not limited to such material, but can be used with equal facility for drying any wet or moist substance.

In order to protect the chute 7 and the wet pulp thereon from contact with the flames and hot air from the furnace 26, the latter has a vertical partition wall 31 slightly wider than the chute, and the latter is located in front of said wall. The chute is therefore completely protected, and the flames are prevented from coming into contact with the wet pulp and burning the same. The partition is made of fire brick which can be renewed as required without injury to the other parts.

I claim:

1. In a drying apparatus, a rotatable drum, and radially extending partition plates in the drum provided with apertures and laterally extending stirrer projections.

2. In a drying apparatus, a rotatable drum, and radially extending partition plates in the drum provided with apertures and laterally extending stirrer projections, said plates being arranged alternately at an angle to each other.

3. In a drying apparatus, a rotatable drum, a feed chute extending into one end of the drum, a source of heat arranged to discharge into said end of the drum, and a heat protecting wall behind the chute.

In testimony whereof I affix my signature.

FRANK V. BURMAN.